United States Patent [19]

Flautt et al.

[11] Patent Number: 5,843,202
[45] Date of Patent: Dec. 1, 1998

[54] APPARATUS FOR FORMING MIGRATION FREE GLASS FIBER PACKAGES

[75] Inventors: Martin C. Flautt, Granville; Thomas O. Matteson; Leonard J. Adzima, both of Pickerington, all of Ohio

[73] Assignee: Owens Corning Fiberglas Technology, Inc., Summit, Ill.

[21] Appl. No.: 975,633

[22] Filed: Nov. 21, 1997

[51] Int. Cl.[6] .................................................. C03C 25/02
[52] U.S. Cl. ................................ 65/532; 65/453; 65/507; 65/530
[58] Field of Search .............................. 65/453, 500, 507, 65/530, 532

[56] References Cited

U.S. PATENT DOCUMENTS

| | | |
|---|---|---|
| 2,234,986 | 3/1941 | Slayter et al. ............................ 65/447 |
| 2,954,582 | 10/1960 | Case .......................................... 65/530 |
| 3,951,631 | 4/1976 | Fulk .......................................... 65/532 |
| 4,049,411 | 9/1977 | Long et al. ............................... 65/478 |
| 4,049,412 | 9/1977 | Dent, Jr. et al. ......................... 65/481 |
| 4,049,415 | 9/1977 | Dent, Jr. ................................... 65/532 |
| 5,055,119 | 10/1991 | Flautt et al. ............................. 65/453 |
| 5,443,611 | 8/1995 | Salvador et al. ........................ 65/507 |

Primary Examiner—Stanley S. Silverman
Assistant Examiner—Sean Vincent
Attorney, Agent, or Firm—C. Michael Gegenheimer; Inger H. Eckert

[57] ABSTRACT

Energy efficient apparatus for forming migration free glass fiber packages composed of fibers bearing substantially uniform coatings of size composition. Heated air from around the fiber forming bushing is drawn into a chamber through which the glass fibers pass to cause the water or solvent in the applied size to be evaporated. The flow of heated air through the chamber is regulated so as to obtain substantially uniform size application to the fibers.

5 Claims, 2 Drawing Sheets

APPARATUS FOR FORMING MIGRATION FREE GLASS FIBER PACKAGES

TECHNICAL FIELD AND INDUSTRIAL APPLICABILITY OF THE INVENTION

The present invention relates to the manufacture of continuous glass fibers via a fiber-forming bushing. More particularly, it relates to using the heated air around the fiber-forming bushing to aid in drying the sizing composition applied to the fibers to provide improved glass fiber packages which are migration free, while regulating the flow of the heated air to obtain substantially uniform application of the sizing composition to the fibers.

BACKGROUND OF THE INVENTION

Glass fiber packages are commonly manufactured by discharging a plurality of molten glass streams from a heated bushing, attenuating the plurality of glass streams into a plurality of fibers, passing the fibers through an applicator to apply an aqueous size composition to the fibers, gathering the sized fibers into a strand at a gathering shoe, and winding the strand onto a collet to produce a glass fiber package. This package is then dried to evaporate the water from the aqueous size.

However, both the manufacturers and users of glass fiber packages produced in such manner are well aware that a problem exists with such packages which is generally referred to in the art as "migration". Migration is visually observable as a discoloration of the fibers in the package. It results during the drying process when the water migrating outwardly in the package takes a portion of the size with it, and thereby deposits more size than normal towards the outer periphery of the package and at various random locations along the way. One way the migration problem has been dealt with is to simply strip away the outer layers from the package to remove the discolored fiber. This, of course, wastes a good deal of material and is uneconomical. Furthermore, the edges of the packages, as when forming a Type 30® square-edged package, can also have this migration problem and they, of course, cannot always be stripped away. As a result, when such packages are used, there are periodic "chinks" of discolored material resulting from this edge migration occurrence. Since, users of such packages generally find this visual occurrence of "chinks" to be unsatisfactory, attempts have been made to dry the sizing on the fibers prior to winding them into a package.

One such method for eliminating the problem of migration is disclosed in U.S. Pat. No. 5,055,119, wherein a migration free package is provided by drawing ambient air from circumferentially about the bushing into a heat transfer chamber through which the fibers pass between the bushing and the winder. The open end of the chamber is located below the heated bushing and sufficiently close thereto so that the air being drawn into the chamber is heated by the heated bushing. The heated air moves through the chamber in heat transfer contact with the fibers to help dry the applied size, and is removed from the chamber at a location adjacent to the chamber's bottom. The chamber extends beneath the size applicator and is essentially circumferentially disposed about the fibers so that the heated air can evaporate any fluid from the size, i.e. water or solvent.

However, while the above method provides an energy efficient process for drying the size on the fiber before forming the fibers into a package, and, thus, significantly reduces, if not eliminates, the problem of size migration, some drawbacks have been noted in certain circumstances with regard to the uniformity of the size coating applied to the fibers. In particular, with the larger bushings that are commonplace today for producing a large number of fibers simultaneously, it has been determined that due to the immense heat given off by such bushings, unrestricted air flow into the heat transfer chamber results in insufficient and nonuniform cooling across the fiber fan between the bushing and the size application roller. In particular, the fibers at the exterior edges of the fan are typically cooler than those at the middle of the fan. As a result, greater amounts of the sizing composition are applied to the fibers on the outer edges of the fan than is applied to the fibers in the interior region of the fan. Further, the fibers located in the interior portion of the fan can remain so hot that they do not receive or retain sufficient amounts of the size composition. Accordingly, a need exists for a means to control the flow of air through the chamber so as to achieve uniform and adequate cooling of the fibers across the width of the fiber fan such that they pick up sufficient and substantially uniform quantities of sizing material from the size application roller. This need is satisfied by the invention described herein.

SUMMARY OF THE INVENTION

The present invention provides a modification to the apparatus and process disclosed in U.S. Pat. No. 5,055,119, the disclosure of which is expressly incorporated herein by reference, to ensure the uniform application of sufficient quantities of sizing materials to the glass fibers. In particular, the present invention provides a means for controlling the flow of air adjacent to the fibers so as to control the relative cooling of the fibers to ensure that all of the fibers across the fan are at substantially the same temperature as they cross the size application roller. In this regard, the apparatus of the invention provides an enclosure through which the fibers pass as they emerge from the bushing until they are gathered together for winding into a package.

In accordance with the present invention, the enclosure is divided into two longitudinally aligned chambers below the size application roller, one in which the fibers pass for drying, and the other which serves to divert excess heated air away from the fibers. Further, a damper is placed in the enclosure above the divider such that heated air passing through the enclosure in front of the fiber fan can be diverted away from the fibers into the hot air diversion chamber to control the amount of air that actually passes with the fibers through the drying chamber. Accordingly, after passing over the size application roller, the fibers and a regulated amount of heated air pass through a drying chamber before being gathered by the gathering shoe and wound to form a package.

Additionally, a vent is provided in the back of the enclosure above the size application roller (i.e., in the bead shield) to similarly control the amount of heated air entering the enclosure from behind the fiber fan. By varying the size of the vent opening across the width of the fiber fan to allow more air to escape from the center of the fan than from the outer edges, a more uniform fiber temperature can be established across the fiber fan at the size applicator. Through the combined use of the damper and vent, it is possible to control the amount of heated air contacting the fibers as they pass through the enclosure between the bushing and the winding device so as to control the temperature of the fibers and increase the uniformity of the size application.

BRIEF DESCRIPTION OF THE DRAWINGS

Referring to the drawings.

DETAILED DESCRIPTION AND PREFERRED EMBODIMENTS OF THE INVENTION

Figure 1:
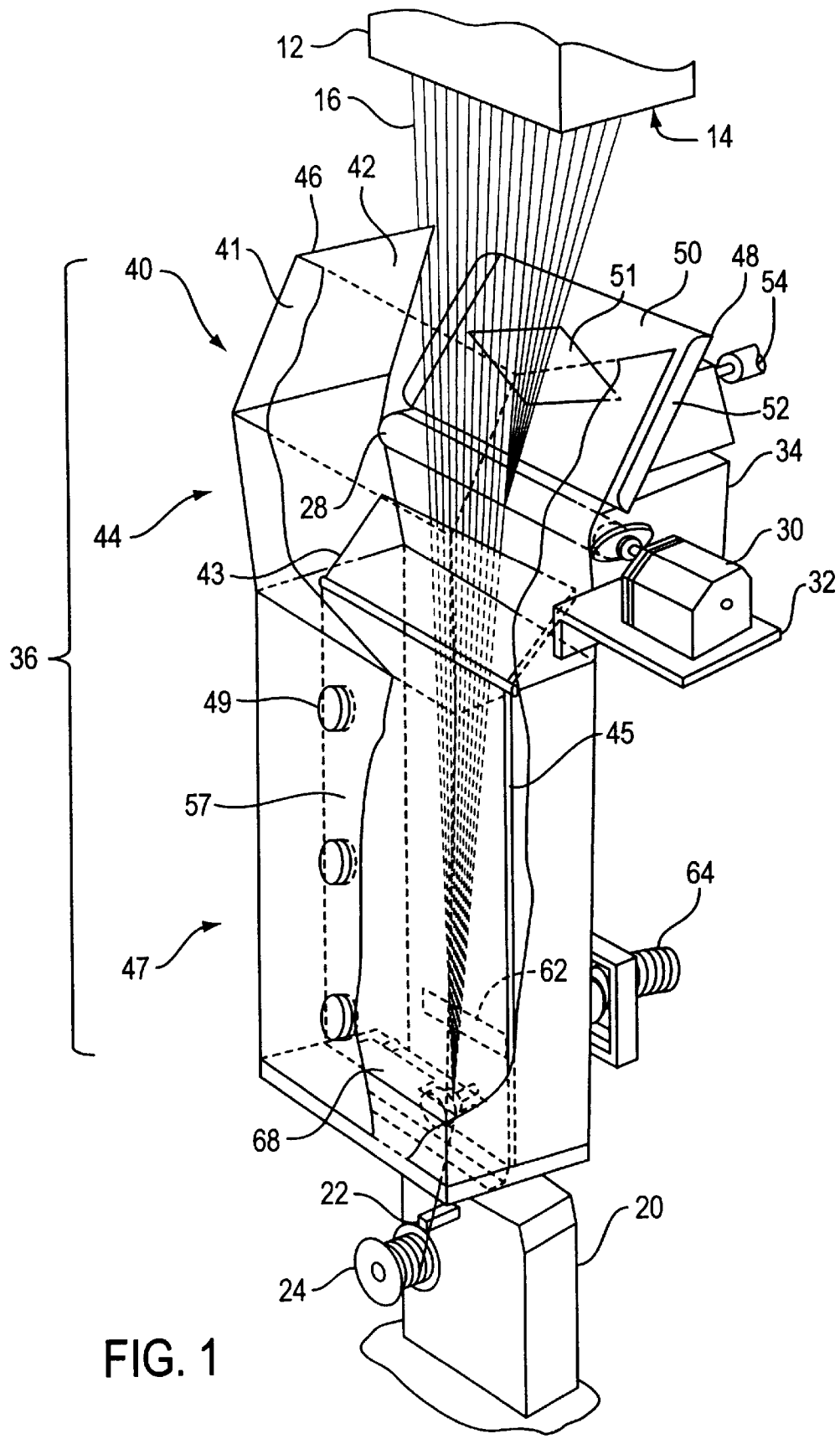
FIG. 1 is an isometric view, partially broken away exemplifying an apparatus as contemplated for use in practicing the present invention.
Figure 2:
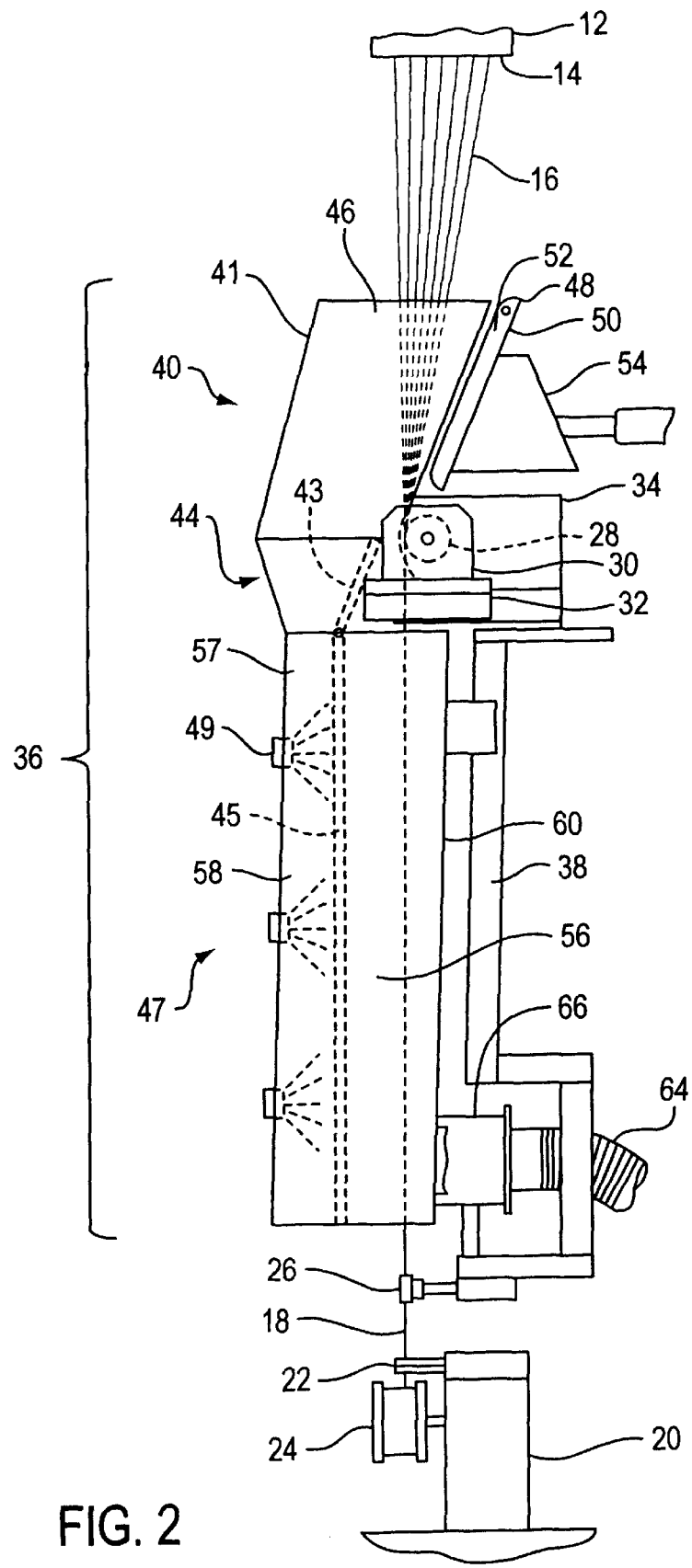
FIG. 2 is a schematic, simplified right side elevational view of the apparatus of FIG. 1.

Referring to the drawings, an apparatus is generally shown for forming glass fiber packages which are migration free and which are composed of fibers bearing substantially uniform size coatings. The apparatus illustrated represents the preferred technique and apparatus for practicing the invention by using heat from the bushing and the fibers as the sole source of energy to dry the sizing applied to the glass fibers.

Referring to the drawings, there is generally shown a bushing member 12 from whose bottom plate 14 molten glass is discharged and formed into a plurality of fibers 16. The bottom plate 14 of the bushing may be "tipless" or it may include the more conventional fiber forming tips adjacent its bottom (not shown). Additionally, it will be realized that when tips are employed, bushing 12 may also include conventional fin-shields (not shown) for cooling the glass emitted from the bushing bottom 14. Significantly, it will be observed that no conventional prepad sprays are illustrated in the drawings. When practicing the present invention to stop migration of an aqueous size, prepad sprays are generally undesirable.

In accordance with conventional practice, a winder 20 attenuates the glass emanating from the bushing bottom 14 to form fibers 16. The fibers 16 are gathered into a bundle or strand 18. This strand, with the assistance of a traversing mechanism 22, is wound on a collet 24 to produce a final fiber package. Any conventional gathering shoe 26 may be employed to gather the fan of fibers 16 into a strand. Also in a conventional manner, fibers 16 are brought into contact with a rotating cylindrical size applicator 28. Size applicator 28 rotates in a trough (not shown) which contains the size. The applicator is rotatingly driven by a suitable driving means 30 carried on a suitable support 32. Applicator 28 is generally enclosed within and rotatably carried by a housing 34.

In order to achieve drying of the size on the fibers prior to their being wound into a package, there is provided a heat transfer, or drying, enclosure generally designated 36. Enclosure 36 receives heated air at a point above applicator 28, and maintains enclosed heat transfer contact between the heated air and the fibers for a sufficient period of time that the fibers of the wound package are dry and migration free. Enclosure 36, therefore, extends to a point sufficiently below applicator 28 to allow such drying to be effected. An extension of several feet, e.g., at least three feet below applicator 28 is typically required. The heat transfer enclosure can be held in place by any suitable structural support generally designated 38. Enclosure 36 may be viewed as including three portions, namely, an upper portion 40, a lower portion 47, and an intermediate portion 44, each of which are designed and supported in a manner to allow opening and easy access to fibers 16 and applicator 28.

Upper portion 40 includes an uppermost open, preferably, generally rectangular end 42 which is disposed beneath the heated bushing 12. Generally, it is preferred that the uppermost open end portion 42 of enclosure 36 be disposed about nine to about sixteen inches below the bushing bottom 14, i.e., the bottom surface of a "tipless" bushing or the bottoms of the tips when such a bushing is employed. Upper portion 40 generally proceeds forwardly and downwardly from end 42 and includes a front face 41 and rearwardly extending side panels 46. The rearmost portion of upper portion 40 is preferably defined by a bead shield 48. Bead shield 48 includes a flat inclined rearward surface 50 and forwardly extending sides 52. Rearward surface 50 and front face 41 slightly converge toward each other. Bead shield 48 includes conventional means 54 for moving the bead shield forwardly and rearwardly respectively. As shown in the drawings, bead shield 48 is in its operative rearward position.

Additionally, the rearward surface 50 of bead shield 48 has a vent opening 51 therein to allow some of the heated air drawn into the upper portion behind the fibers to exit the enclosure rather than pass through the enclosure with the fibers. Preferably, opening 51 is equipped with an adjustable cover, not shown, that enables the size and/or shape of the vent opening to be controlled. Further, it is generally preferred that, the vent opening and cover interact to define a passage of a geometrical configuration that allows more air to exit from the central region of the fiber fan than at the side edges of the fan. For example, suitable passage configurations may include diamond, triangular, and elliptical openings.

Middle portion or intermediate portion 44 of enclosure 36 proceeds generally rearwardly and downwardly from upper portion 42. The front face and side panels of middle portion 44 are generally an extension of the front face and side panels of upper portion 40. The applicator housing 34 generally functions as a portion of the back wall for each of upper portion 40 and middle portion 44, and is so arranged and constructed that the applicator is brought into contact with the fan of converging fibers 16. Generally, the applicator 28 is preferably positioned from about 20 to about 30 inches from the bushing bottom 14.

Lower enclosure portion 47, like upper portion 40 and middle portion 44, is preferably rectangular in cross section. Lower portion 47 is divided lengthwise, i.e., vertically, by wall 45 into two longitudinal chambers, drying chamber 56 through which the fibers pass, and air diversion chamber 58. Wall 45 is oriented in lower portion 47 such that its planar face is substantially parallel to the width of the fiber fan, and is attached along its side edges to the sides of the enclosure by welding or other suitable means.

Accordingly, drying chamber 56 is circumferentially disposed about glass fibers 16. Rear wall 60 of drying chamber 56 includes an air outlet passageway 62 near its bottom. Means are provided for removing air from the chamber and include a duct 64 attached to the negative pressure side of a suitable air pump or air blower (not shown). Duct 64 is in fluid communication with an adapter portion 66 which serves to provide fluid communication between duct 64 and the internal portions of chamber 56. If desired, a suitable slide gate (not shown) may be employed with either the duct or adapter to control air flow. The bottom portion of the drying chamber 56 also may include a movable slide gate 68 which controls the size of the opening through which the fibers flow en route to gathering shoe 26. This slide gate can also be used to assist in controlling the amount of air drawn into upper end 42.

At the top of wall 45, and attached thereto, is damper 43 which controls the amount of heated air that passes with the fibers through the drying chamber 56, or which is directed through the air diversion chamber 58. Damper 43 is pivotally attached to wall 45 along its top edge such that it can be pivoted toward the fan of fibers to divert more of the heated air away from the fibers and into the diversion chamber, or pivoted away from the fibers to allow more heated air to pass through the drying chamber with the fibers. Damper 43 preferably has a means that extends outside the walls of enclosure 36 to permit adjustment of the positioning of the pivotal damper. Preferably, the adjusting means is equipped with a fixed stop that prevents the damper from coming into contact with the fiber fan. Further, the damper is preferably of a size and positioned such that when it is positioned closest to the fiber fan, its top edge is adjacent the size application roller, so that it, in combination with the vent opening above the size application roller, effectively control the amount of heated air passing through the drying chamber 56.

The front face 57 of air diversion chamber 58 is preferably equipped with spray nozzles or jets 49 in flow communication with a water supply (not shown) for spraying water into the chamber to cool the air passing therethrough. Additionally, the bottom of diversion chamber 58 is preferably open to permit the air passing therethrough to exit into the fiber-forming environment.

It is generally recommended that the unit have a capability of moving 50 to 200 cfm of air at a glass throughput of 60 pounds and about 100 to 500 cfm at a 200 pounds per hour throughput. However, for large bushings having throughputs of from 200 to greater than 300 pounds per hour, it has been discovered that high air flow rates can have a negative impact on size application due to the immense heat carried by the air under such bushings. Accordingly, the vent opening and damper in the apparatus of the invention permit regulation of the air flow around the size applicator and through the drying chamber to enhance the application of size to the fibers.

Thus, according to the invention, it will be apparent that ambient air in the plant circumferentially about the bushing flows beneath the bottom wall 14 into the upper open end 42 of enclosure 36. Excess heated air admitted into enclosure 36 may be vented through vent opening 51 and/or diverted away from the fibers by damper 43. The remaining air proceeds downwardly through the drying chamber 56 with the fibers and is removed adjacent the bottom of drying chamber through duct 64. In this way, the fluid, whether it be solvent or in the preferred embodiment water from an aqueous size, is evaporated from the fibers and removed through duct 64. The package formed by winding strand 18 onto collet 24 will be completely dry and free of migration problems.

The fluid of the size applied to the fibers according to the invention may either contain an organic solvent or water. As indicated, maximum benefit of the present invention is obtained when employing an aqueous based size. Such size compositions are well known in the art. Aqueous based sizes typically include about 93 to about 96 or 97% water with the balance of the size comprising various size constituents which vary depending on the application. Generally, the size constituents may include one or more film formers, such a for example an epoxy, lubricants, surfactants, for example, nonionic, cationic and anionic surfactants, thickeners and coupling agents. Typically the size which is applied will provide a water content of approximately at least about 6% up to about on the order of about 12 or 13%. Best results have been obtained by using a water content in the order of about 10% and completely drying the fibers, that is drying them to a moisture content of less than about 0.02% water. This eliminates migration.

A preferred aqueous size composition for use in the apparatus and process of the invention comprises one or more heteropolysaccharides, in addition to the standard coupling agents, lubricants and film formers of conventional aqueous sizes. Inclusion of the heteropolysaccharide in the sizing provides improved application uniformity under high temperature conditions. Such a sizing composition is described in greater detail in a copending U.S. Patent Application filed concurrently herewith, the disclosure of which is expressly incorporated herein by reference.

The preferred heteropolysaccharide is insensitive to heat over a wide temperature range and is soluble in cold water. In addition, the preferred heteropolysaccharide should be selected so as to have no negative effect on properties such as burst strength, cyclic fatigue or tensile strength. It should also have a viscosity of about 200 to about 500 cps in the temperature range of about 60° F. to about 160° F. A preferred heteropolysaccharide is a polysaccharide gum. A particularly preferred polysaccharide gum is rhamsan gum such as Kelco K1 A112 obtained from The NutraSweet Kelco Company, San Diego, Calif. Starches may be added in a range from about 0.001% to about 3.0%, more preferably in a range from about 0.05 to about 0.5%. Preferably, the starches are added in an amount of from about 0.05% to about 0.25%, with 0.25% being the most preferred.

The preferred coupling agent should be a liquid at room temperature. Suitable coupling agents include organofunctional silanes, such as 3-glycidoxypropyltrimethoxy silane. The preferred coupling agents for use in the invention are 3-aminopropyltriethoxy silane and 3-methacryloxypropyltrimethoxy silane, commercially available from OSi Specialties of Witco sold under the trade designations A-1100 and A174, respectively. Preferably, the organofunctional silanes are used in an amount of from about 0.10% to about 2.00% of the sizing composition.

Film formers useful in the invention include film formers which are water based is low molecular weight epoxy emulsions. For example, a suitable film former is an epoxy emulsion such as AD502 obtained from Owens-Corning.

One or more lubricants may also be used in the invention. Useful lubricants include those that are cationic or nonionic. For example, suitable lubricants include MS-8 obtained from Henkel Corp.; Trylube 7607 obtained from Henkel Corp., and PVP-K-90 obtained from GAF.

The sizing of the present invention may be applied at temperatures ranging from about 60° F. to about 160° F. Preferably, it is applied in the range of from 70° F. to 100° F.; and in a particularly preferred embodiment, the sizing is applied at 80° F. degrees. The most preferred sizing is applied at a temperature less than 180° F.

The sizing may be applied at viscosities ranging from 50 to 1000 cps. Preferably, this sizing is applied in the range of 200 to 500 cps. In a particularly preferred embodiment, the sizing is applied at a viscosity of about 380 cps at 27° C. The viscosity given is in cps as measured with a Brookfield viscometer using a no. 31 spindle.

In addition to the above-mentioned components of such size compositions, other components normally added to glass fiber sizing compositions can also be present. For example, such sizing compositions may contain antistatic agents, cross-linking agents or hardeners, antioxidants, cationic lubricants for reducing fuzzy or broken filaments, nonionic lubricants, nucleating agents, or small amounts of pigment, etc. An example of a useful cross-linking agent would be a bis-silane.

An exemplary heteropolysaccharide sizing composition that may be used in combination with the apparatus of the invention to improve high temperature size application uniformity is set forth below.

EXAMPLE 1

The following sizing was prepared for this example and is designated "A".

| A | % [by weight or relative amount?] |
|---|---|
| AD502 (epoxy emulsion) | 5.00% |
| Acetoc Acod | 0.85 |
| A174 (silane) | 1.00 |
| A1100 (silane) | 0.25 |
| MS-8 (lubricant) | 1.00 |
| Trylube 7607 (lubricant) | 0.25 |
| PVP-K-90 (lubricant) | 0.25 |
| Deionized water | 91.40 |

To the above composition 0.25% of the Kelco K1 A112 heteropolysaccharide was added to make formulation "B."

Each formula was then tested for viscosity at various temperatures. The viscosity measurement was carried out after the sample had been at the temperature for 30 minutes. The results are below in Table 1.

TABLE 1

| Formula | A (no starch) | B (with .25% starch) |
|---|---|---|
| Viscosity in cps after 30 min at various room temperatures | | |
| 100° F | 440 | 330 |
| 120° F | 360 | 323 |
| 140° F | 277 | 315 |
| 160° F | 168 | 312 |
| 180° F | 57 | 369 |

What is claimed:

1. An apparatus for drying sizing compositions disposed onto a fan of fibers attenuated from molten glass streams emerging from a heated bushing prior to the fibers being gathered into a strand and wound to form a package, said apparatus comprising:

(a) an enclosure through which said fibers pass, comprised of front, back and side wall portions, disposed below said bushing and spaced sufficiently therefrom for heated air around the bushing to be drawn into said enclosure and pass therethrough with said fibers;

(b) a size applicator mounted adjacent said back wall portion for applying a size composition to the fan of fibers passing through said enclosure;

(c) a vent opening in said back wall portion above said size applicator for permitting some of said heated air to exit said enclosure;

(d) a divider disposed in said enclosure below said size applicator to form a first and second longitudinal chamber in said enclosure, wherein said fibers pass through said first chamber; and (e) a damper pivotally attached to said divider at its end adjacent said size applicator for controlling the relative amounts of heated air passing through said first and second chambers.

2. The apparatus of claim 1, wherein said vent opening permits more air to exit the enclosure from the center of the fiber fan than at the side edges of the fiber fan.

3. The apparatus of claim 1, wherein said vent opening is equipped with an adjustable closure for regulating the size of the opening.

4. The apparatus of claim 1, wherein said size applicator forms a portion of said back wall of said enclosure.

5. The apparatus of claim 1, wherein said second chamber has spray means mounted in the walls thereof to permit water to be sprayed into said chamber to cool the heated air passing therethrough.

* * * * *